(No Model.)
W. E. LAMSON.
TROTTING SULKY.
No. 377,035. Patented Jan. 31, 1888.
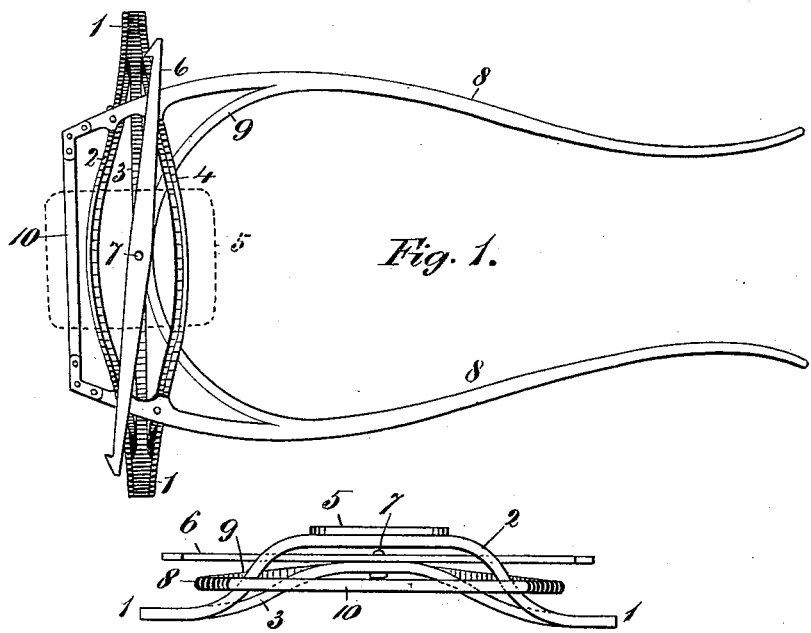
Fig. 1.
Fig. 2.
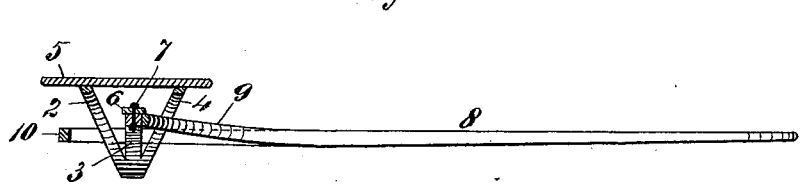
Fig. 3.
Witnesses:
John Grist
C. G. Pennock
Inventor:
W. E. Lamson
By Henry Grist
Attorney.

UNITED STATES PATENT OFFICE.

WILLIAM E. LAMSON, OF SARNIA, ONTARIO, CANADA.

TROTTING-SULKY.

SPECIFICATION forming part of Letters Patent No. 377,035, dated January 31, 1888

Application filed June 15, 1887. Serial No. 241,345. (No model.) Patented in Canada February 7, 1887, No. 25,934.

*To all whom it may concern:*

Be it known that I, WILLIAM E. LAMSON, of the town of Sarnia, in the Province of Ontario, in the Dominion of Canada, have invented certain new and useful Improvements in Trotting-Sulkies, (which was patented to me in Canada February 7, 1887, No. 25,934;) and I do hereby declare that the following is a full, clear, and exact description of the same, reference being had to the annexed drawings, in which—

Figure 1 is a top view of my improved sulky-frame. Fig. 2 is a rear elevation; and Fig. 3 is a section on line X X, Fig. 1.

My invention relates to improvements in sulkies having an arched axle, and has for its object to prevent elongation or buckling of the axle by the imposed weight of the driver.

My invention consists of an arched axle having an arched bar at opposite sides and secured at both ends to the axle, said bars bent outwardly and upwardly higher than the axle and connected by the driver's seat, the thills secured to said bars, and the singletree attached to the axle.

1 1 are the spindle ends of the arched axle 3.

2 and 4 are bars bent outwardly and upwardly higher than the axle 3, and secured at the ends to opposite sides of the axle and connected at top by the driver's seat 5, so that the weight of the driver will be thrown on the spindles, and thereby prevent elongation or buckling of the axle.

To the top of the arched axle 3 is attached the singletree 6 by a bolt or pin, 7, to obtain direct draft from the axle at a point directly below the driver's seat. The thills 8 are secured to the bars 2 and 4, and are connected by a bow, 9, which at the middle is secured to the axle, and the rear ends of the thills may be connected by a bar, 10, to give greater stability.

I claim as my invention—

1. In a sulky, an arched axle, 3, having arched bars 2 4 at opposite sides, connected by the driver's seat 5 above the axle, as set forth.

2. In a sulky, an arched axle, 3, having arched bars 2 4 at opposite sides connected by the driver's seat 5, thills 8, secured to said bars, and the singletree 6, attached to the axle below the driver's seat, as set forth.

W. E. LAMSON.

Witnesses:
 JULIUS P. BUCKE,
  *Of Sarnia, Solicitor.*
 GEO. B. DAWSON,
  *Of Sarnia, Law Clerk.*